United States Patent Office 3,566,715
Patented Mar. 2, 1971

3,566,715
HYDRODYNAMIC TRANSMISSION FOR VEHICLES
Rolf Keller and Traugott Weber, Heidenheim, and Gustav Pistl, Nattheim, Germany, assignors to Voith Getriebe KG., Heidenheim, Germany
Filed Sept. 9, 1968, Ser. No. 767,576
Claims priority, application Germany, Sept. 15, 1967,
P 15 80 952.6; July 10, 1968, P 17 55 916.9
Int. Cl. F16d 67/00; F16h 47/00
U.S. Cl. 74—731　　　　　　　　　　　　　13 Claims

ABSTRACT OF THE DISCLOSURE

The invention concerns a transmission having a unidirectional input shaft and a reversible output shaft and forward and reverse parallel drive trains interconnecting said shafts and each drive train comprising a higher ratio starting fluid flow converter and a lower ratio cruising fluid flow converter. The transmission is started by filling the starting converter of one of said drive trains to drive the output shaft in a respective direction. The transmission goes into cruising by emptying said starting converter and filling the cruising converter of said one drive train at a certain ratio of the speeds of said input and output shafts. A feature of the present invention is the manner of braking the transmission which is accomplished by emptying the one of the said starting and cruising converters of said one drive train which is filled while filling the starting converter of the other drive train, and preventing the filling of the cruising converter of said other drive train during braking.

Figure 1:
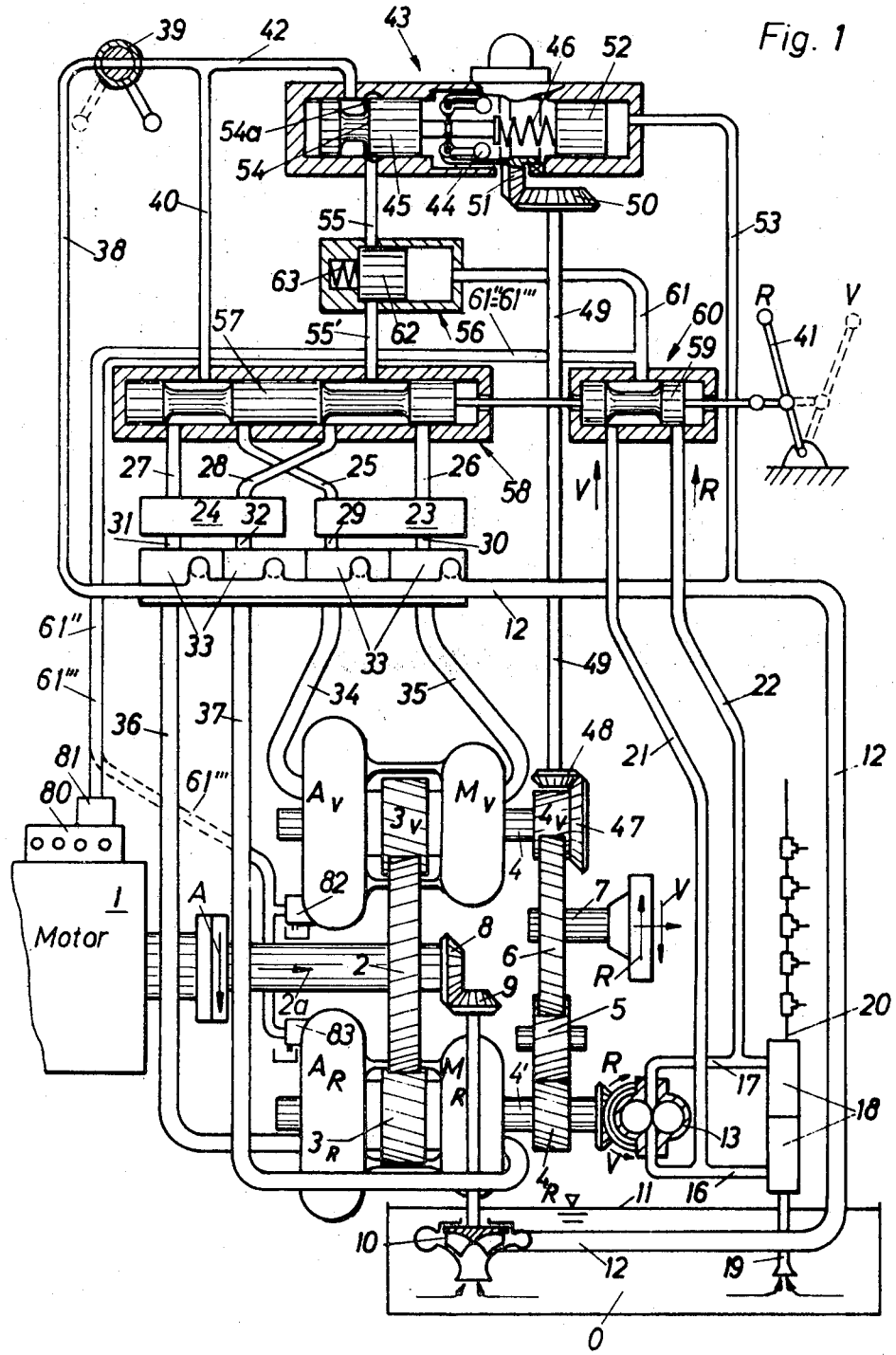

The present invention concerns a transmission for vehicles, especially rail vehicles, with at least two hydraulic circuits (Föttinger circuits), especially torque converters, for each driving direction, in which the hydraulic circuits are adapted to be made effective and ineffective by filling and emptying the same. More specifically, the present invention concerns a transmission of the just described general type with a control device for comparing the input and output speed with each other for an automatic shifting of the circuits (velocity automatics) and with a device for shifting at will from forward drive to rearward drive and vice versa and for a hydraulic braking by shift-over at will to the respective fluid circuit pertaining to the respective opposited driving direction. Transmissions of this type are known as two speed-turbo-reversible transmissions and are employed in particular in locomotives which are used for switching operations.

The hydrodynamic braking is carried out by emptying the respective working circuit during the forward drive and filling the respective circuit for the rearward drive. The locomotive will then, with the rearward drive engaged, first still drive forwardly. This means that during the braking operation the speed ratio of the input drive to the output drive of the filled converter is negative.

The afore-mentioned velocity automatics, however, operates independently of whether pulling or braking operation prevails because it carries out merely a speed comparison which means that it only ascertains the numerical values but cannot distinguish between positive and negative values, in other words, whether a pulling or a braking operation is being carried out. If in the second velocity range the hydraulic braking operation is initiated, due to the velocity automatics, during the braking operation also the second velocity range would become effective and only after a gradual braking to the speed ratio provided for the shift-over, such shift-over to the first rearward velocity range would occur. This, however, would mean a considerable increase or jump in the occurring braking force. This is due to the face that the braking forces of the turbo-reversible transmission follow a completely different course through the output speed of the transmission than do the pulling forces The curves of the pulling force of the different torque converters of a transmission intersect and at the point of intersection, i.e. when torque equality has been established, the automatic shift-over from one to the other torque converter is effected. In contrast thereto, the braking force curve of the starting converter is located in the area of considerably higher torques than the braking curve of the working circuit of the cruising converter and does not intersect the same. The jump in the braking force would be extremely uncomfortable for the passengers as well as for the freight. Moreover, in view of this jump in the braking force, the wheels would shimmy on the rails, and the braking operation would slip temporarily out of the control of the locomotive engineer. In addition thereto, the heat development in the cruising converter would at the same braking force be considerably higher than would be the case when braking with the starting converter.

It is, therefore, an object of the persent invention to provide a hydrodynamic transmission for vehicles which will overcome the above mentioned drawbacks.

It is another object of this invention to provide a hydrodynamic transmission which, when making the hydraulic braking operation effective, will automatically and independently of the respective engaged fluid circuit making effective the starting circuit of the opposite driving direction, and which during the hydraulic braking operation will prevent an automatic shift-over from one to the other fluid circuit.

These and other objects and advantages of the invention will appear more clearly from the following specification in connection with the accompanying drawings, in which:

FIG. 1 diagrammatically illustrates a two velocity range turbo-reversible transmission for a locomotive with a control system according to the invention and, more specifically, shows this transmission in its position during the braking operation from a high speed and with the two selective possibilities for a further limiting of the braking moment.

Figure 2:
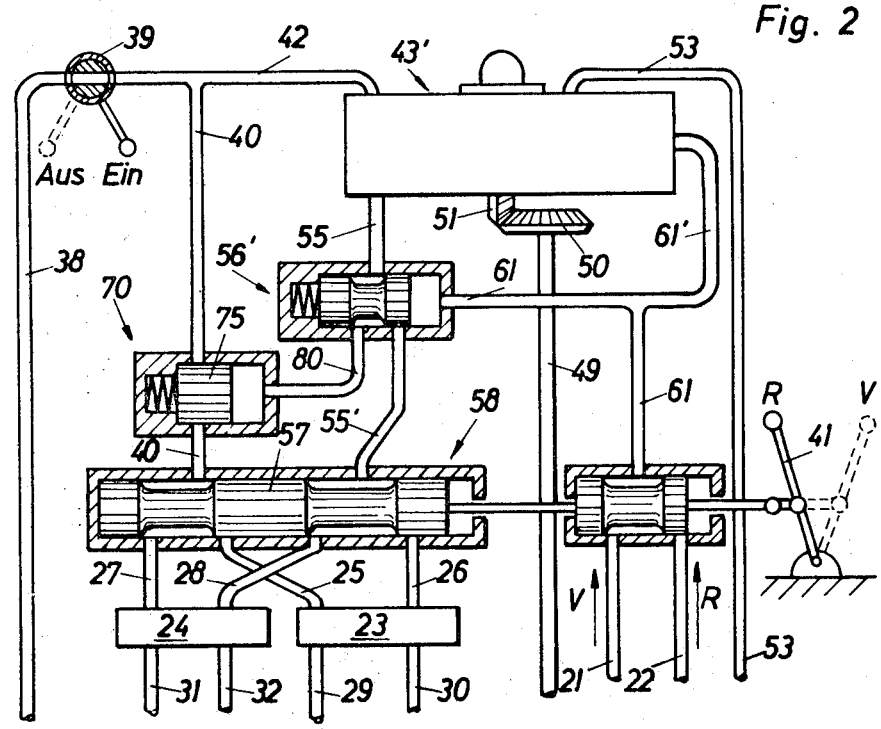

FIG. 2 diagrammatically shows the control system of FIG. 1 equipped with the blocking means against hydraulic braking from very high velocities and also during the braking operation.

Figure 3:
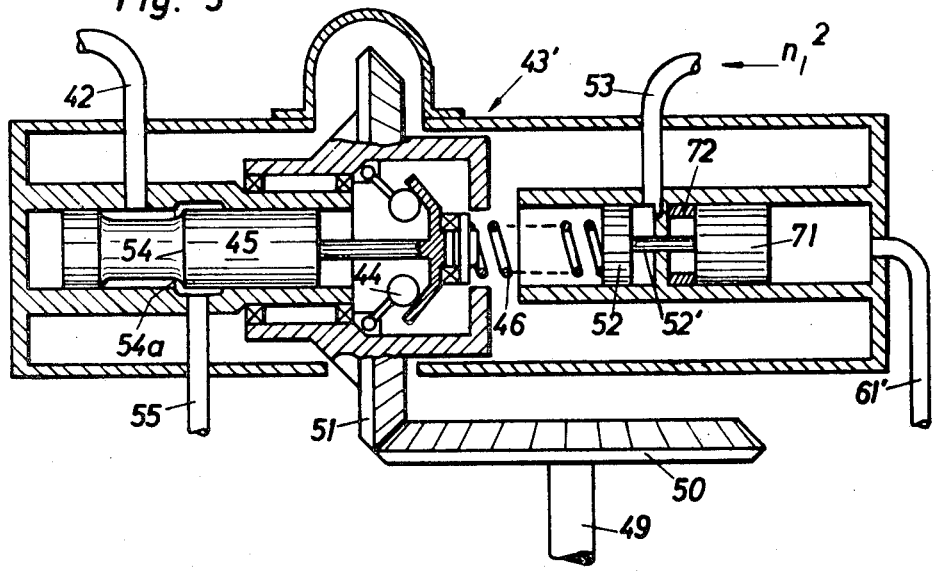

FIG. 3 shows an automatically effective control device for shift-over from the control system of FIG. 2, said control device being shown in section and on a larger scale than in FIGS. 1 and 2.

According to the present invention it is suggested to prevent the automatic changing of the filling during the braking operation and to brake only with the starting converter. To this end, a device is provided which automatically, when initiating the hydraulic braking operation, and independently of the respective effective fluid circuit will engage the starting circuit of the opposite driving direction and will during the hydraulic braking operation prevent an automatic shifting from one to the other fluid circuit.

According to a further development of this feature in connection with the aforementioned transmission, the device is composed of two sections one of which serves for ascertaining the hydraulic braking by ascertaining the difference between the actual and the command driving direction and by releasing a corresponding signal, whereas the other section will, in conformity with this signal, prevent the engagement of the lower step-down fluid circuit of the commanded driving direction.

When hydraulically braking at very high driving speed, especially of a heavy train, the heat development in the working medium is very high and an overheating occurs or at least a premature aging of the working fluid. In addition thereto, when hydraulically braking at very high driving speed, on one hand considerable loads will act upon the bearings of the gear-equipped transmission shafts in view of the high tooth flank pressures, while on the other hand high axial loads occur in the bearings of the pump and turbine wheel shafts in view of the axial thrusts. Therefore, it is intended in conformity with the present invention to limit in upward direction the velocity range in which hydraulic braking is possible, for instance, by filling the starting circuit of the opposite driving direction. Above the said limit, only mechanical braking will be possible, for instance, by causing braking blocks to engage the running wheels. Therefore, according to a further development of the invention, a further device is suggested which, when it is attempted to hydraulically brake above a certain high velocity, will first permit only a mechanical braking, and only after the said velocity has decreased to a certain extent will a filling of the starting circuit of the opposite driving direction be possible.

According to the heretofore advanced suggestions, a shock-like or excessive braking of the locomotive is eliminated by the fact that the automatic changing of the filling of the hydraulic speeds is prevented or the upper velocity range for the hydrodynamic brake is cut down. With locomotives having a starting speed and a cruising speed, which locomotives cruise at relatively high cruising speeds, it is possible that when hydraulically braking at the cruising speed, the negative speed ratio of converter starting speed and the output speed may become so high that there exists the danger of an excessive braking because by blocking the control automatics, the braking is effected by means of the starting converter having a higher step-down transmission ratio. Consequently, the wheels may drag or grind on the rails—the hydrodynamically braked wheels rotate at a lower speed than the rolling wheels—as a result of which the braking force of the locomotive suddenly drops to a far lower value. The required braking strokes can, therefore, no longer be realized.

It is, therefore, another object of this invention to provide a control arrangement by means of which an excessive braking can be prevented of vehicles which drive at a high speed and which are to be braked hydrodynamically by means of a converter.

For purposes of solving this problem, some locomotives are equipped with measuring and control units of their own which are operatively connected to the control of the output and/or the speed of the driving motor and which during the hydraulic braking operation limit the output or the speed to a certain upper value. In order to save these measuring and control units, it is suggested according to a further developement of the present invention to derive the impulse ascertaining the fact of the braking from the control system of the reversible transmission itself and thereby to influence the control of the output and/or the speed of the driving motor in such a way that the output or the speed will be limited to a certain upper value. According to the output characteristics of the converter to be used for braking, each primary speed, even in the negative speed range, has a certain value of the transmissible output associated therewith. Corresponding values of the speed or of the output of the primary side are thus equivalent magnitudes which in the same way can be employed for indicating the limit of the braking force.

According to another suggestion it is provided that the respective converter used for braking and pertaining to each driving direction has at the outer circumference of the working chamber arranged a check valve which communicates with the oil sump. Furthermore, a device is provided which during the normal drive blocks the valve is closed position and only during the hydrodynamic braking operation opens up the pressure limiting valve in such a way that the pressure in the working chamber of the inverter will be limited to a certain maximum value is closed position and only during the hydrodynamic analogous connection exists between the superimposed pressure of a converter and the transmissible torque and, more specifically, in the traction as well as in the braking range, which means with a positive as well as with a negative ratio of primary to secondary speed; in other words, low pressure, low braking moment, and vice versa.

While the suggestions advanced so far solve the problem of excessive braking in view of a braking force shock, in connection with two speed-turbo-reversible transmissions, and more specifically solve the problem of excessive braking from high velocities by taking out this range for hydrodynamic braking, and so to speak, cutting down the possibilities on the output side without, however, sufficiently harnessing yet the obtainable braking forces, according to one of the last mentioned suggestions for one or more speed hydrodynamic reversible transmissions, a reduction in the braking force is provided by cutting down the speed on the input side, whereas according to another suggestion it is proposed to provide an upper limit of the braking moment by partially filling the converter itself by means of overpressure control.

According to a further development of the last mentioned suggestion it is proposed that the device acting upon the pressure limiting valve be designed as a device for adjusting the spring preload which latter is continuosly adjusted for a fixed value of always the same magnitude. This arrangement is based on the fact that with an ordinary converter during braking operation, i.e. when the blade wheels rotate in opposite direction with regard to each other, a considerably higher superimposed pressure builds up than during traction operation and that a cutting down of said pressure during the braking operation to a pressure still higher than the maximum traction superimposed pressure will suffice for an effective and sufficient reduction in the braking moment.

According to another feature of the invention for further devoloping the last mentioned suggestion, it is provided that during the customary driving period the spring preload of the pressure limiting valve or relief valve is kept at a high value and is reduced only during the hydrodynamic braking operation. In this connection it is to be borne in mind that for sufficiently reducing the braking moment it is necessary during the braking operation to lower the superimposing pressure below the maximum value of the superimposing pressure during traction.

According to a still further feature of the invention, the spring preload of the relief valve is affected in conformity with the driving speed or motor speed, i.e. is influenced by the possible maximum output in order to make it possible to correct the course of the braking moment at variable speed and variable power intake of the converter. This is possible on one hand by means of the speed dependable pressure of the lubricating pump driven on the secondary side, and on the other hand by means of the filling pump on the primary side, which pump likewise produces a speed dependable pressure.

The hydrodynamic transmission according to FIG. 1 which also applies to the arrangement of FIG. 2 comprises primarily four converters, namely, the forward start converter $A_V$, the cruise forward converter $M_V$, the rearward start converter $A_R$, and the rearward cruise converter $M_R$. In the direction of the arrow A the motor 1 through the step-up gear 2 drives the two primary shaft pinions $3_V$ and $3_R$ of the forward and rearward converter set which two sets rotate in the same direction, but opposite to the direction of rotation of the motor 1. The secondary shafts extend from those sides of the converter sets which are remote from the motor 1 and have fixedly connected thereto the secondary pinions $4_V$ and $4_R$ respectively. These pinions $4_V$ and $4_R$ likewise rotate in the same direction of rotation when the locomotive is driving. The reversal in the direction is obtained by the reversing pinion 5. The direction of rotation of the secondary pinions $4_V$ and $4_R$ and thus the driving direction of the locomotive depends on which of the two converter sets has the converter filled. If a converter of the rearward converter set $A_R$, $M_R$, is filled, the output gear 6 and consequently the output shaft 7 connected thereto rotates in the direction of the arrow R and in the other instance rotates in the direction of the arrow V.

The shaft $2a$ having keyed thereto the gear 2 drives the filling pump 10 through a bevel tear transmission 8, 9. The filling pump 10 may, for instance, be a centrifugal or rotary pump. This pump 10 draws the operating oil from an oil reservoir O below the oil level 11 and presses the drawn-off oil into the filling pressure conduit 12. The lubricating pump 13 for the parts which are moved on the secondary side is driven by the secondary shaft 4' of the rearward converter set through the intervention of the bevel gears 14, 15. This pump is a gear pump and has two connections 16 and 17. Depending on the driving direction of the locomotive, in other words depending on the direction of rotation of the bevel gear 15 in the forward direction V or the rearward direction R, the said pump 10 delivers fluid into the conduit 16 or 17 respectively. Shift-over devices 18 see to it that the flow of lubricating oil will also when the direction of the pump drive is reversed is always drawn in at the conduit 19 and passes through the pressure line 20 to the individual lubricating areas.

The control system for the transmission comprises a pair of reversing valves 23, 24 into which lead the conduits 25, 26; 27, 28 and from which lead to the outside the conduits 29, 30; 31, 32. These reversing valves are so designed that when only the conduit 25 or 27 is under pressure the pressure is conveyed to the conduit 29, 31 respectively and when both conduits 25 and 26 or 27 and 28 are under pressure, the pressure is conveyed to the conduits 30, 32 respectively. The conduits 29–32 each lead to a separate pressure operable servo-shutoff valve 33. All of said shutoff valves 33 are respectively located in branches of the filling pressure line 12 and the outlets thereof are respectively through conduits 34, 35, 36; 37 in communication with a filling connection of the respective converters. Branching off from the line 12 is a control line 38 having interposed therein a shutoff valve 39. When valve 39 is opened, while the motor 1 is running, oil will pass into the control system. If the locomotive is at a standstill or drives only slowly, the control oil passes through a pilot line 40 for the starting converter into the conduits 25 or 27 depending on the position of the driving direction lever 41 and thus on the position of the piston 57 of the double flow reversing valve 58. Thereupon, line 29 or 31 is supplied with oil under pressure, and the starting converter for forward or rearward drive is filled, thus, if for instance the locomotive is at a standstill and the motor is running, by opening the valve 39 one of the two starting converters is filled, depending on the position of the driving direction lever. The locomotive will then start driving in the selected direction.

By opening the valve, also control oil passes through conduit 42 to the reversing device 43. The reversing device 43 is provided with a centrifugal pendulum comprising centrifugal weights 44, a piston 45 axially displaceable by the radial movement of the centrifugal weights, and a spring 46 acting against the centrifugal force of the weights. The centrifugal force pendulum is driven by the secondary side of the hydrodynamic transmission, for instance through the intervention of the king shaft drive 47 to 51. The force exerted by the centrifugal force pendulum upon the spring is proportional to the square of a speed ($\sim n_2^2$). Spring 42 rests on another piston 52. The pressure chamber pertaining to piston 42 communicates through conduit 53 and pressure fluid conveying conduit 12 with the pressure side of the centrifugal pump 10 which is driven at the primary side. The pressure obtainable by a centrifugal pump is likewise proportional to the square of the driving speed thereof. The force exerted by piston 52 upon the spring 46 is thus proportional to the square of the primary speed of the transmission ($\sim n_1^2$). In the reversing device 43, the squares of the speeds of the primary and secondary sides are compared with each other. A certain position of the piston 45 corresponds to each ratio of the squares $(n_2/n_1)^2$. This means that also a certain position of the piston 44 corresponds to each linear ratio value $(n_2/n_1)$. This piston is formed by a shut-off valve piston. The shut-off valve has two corresponding control edges 54 and 54a which depending on the position of piston 45 interrupt or establish communication between conduit 42 and conduit 55.

The shift-over from starting converter to cruising converter is effected independently of the driving speed and the load acting on the locomotive at a certain definite ratio of the speeds of the primary and secondary side. The respective prevailing ratio of the speeds is continuously ascertained in the control device 43. At the shift-over value, the corresponding control edges 54 and 54a of the shift-over device are precisely arranged one above the other. When the said shift-over value of the said ratio is exceeded, communication between conduits 42 and 55 is established. If, however, the said shift-over value of said ratio drops below said predetermined value, the said communication between conduits 42 and 55 is interrupted again. An increase in the motor speed at constant driving velocity acts so as to bring about a shift-over to the driving converter whereas an increase in the driving velocity at constant motor speed brings about a shifting to the cruising converter.

Above the shift-over value, the pilot control line 55' for the cruising converter is by means of the control device supplied with fluid under pressure. In this connection it will be understood that the self-opening shut-off valve 56 is open during traction operation. Depending on the position of the lever 41, and therefore, of the piston 57, the conduits 25 and 26 or the conduits 27 and 28 will be under pressure and, consequently, the respective one of conduit 30 or 32 will be under pressure which means that the cruising converter for one of the forward and rearward drive is filled. In view of the fact that no filling pressure prevails in the other converters, the latter will immediately be emptied.

If it is desired to brake the locomotive, the locomotive engineer shifts the driving lever 41, for instance from forward (position V) to rearward (position R). Thereupon, while the locomotive first still moves forward with undiminished speed, the rearward converter is filled for the starting phase. The invention sees to it that independently of whether in conformity with the prevailing ratio of output speed to input speed the cruising converter should be engaged or not, the starting converter will at any rate be employed for hydraulic braking. To this end, two conduits 21 and 22 are respectively branched off from the two sections 16 and 17 of the secondary lubricating pump 13. Conduit 21 is under pressure during the forward drive of the locomotive and conduit 22 is under pressure during the rearward drive (arrows V and R respectively). By actuating the lever 41 for the driving direction, in addition to piston 57 also the piston 59 of the reversing valve 60 is displaced. Depending on the position of the piston 59, one of the two conduits 21 and 22 is brought into communication with the braking pressure conduit 61 which leads into the pressure chamber pertaining to the shut-off piston 62 which forms a part of the shut-off valve 56 adapted to open automatically by the spring 63. The connections of the conduits 21 and 22 with the reversing valve 60 are so selected that when shifting to rearward drive, the conduit 21 which is under pressure during forward drive is placed into communication with the braking pressure conduit 61, whereas when shifting to forward drive, the conduit 22 which is under pressure during the rearward drive is placed into communication with the braking pressure conduit 61. By these steps which are important for the present invention, it will be realized that only the actual driving direction of the locomotive differs from the preset driving direction, in other words when hydraulically braking, the conduit 61 will be supplied with pressure fluid. In case of hydraulically braking, the pilot conduit 55' for the cruising converter is at any rate made pressure-free by closing the valve 56. This means that during hydraulic braking only the starting converter is engaged whereby a shifting of the speeds or velocity ranges during the hydraulic braking will be avoided.

From the conduit 61 which receives the pressure fluid only during the hydrodynamic braking operation, there branches off a conduit 61'' which leads to a hydraulically operable device 81 for limiting the quantity of filling fluid. This device 81 which is hydraulically operable is arranged at the injection pump 80 of the motor 1. This device 81 reduces the maximum possible motor speed while limiting the pressure to a fixed value. As a result thereof, the maximum possible primary speed of the converter and thereby its maximum possible power absorption is fixed. Consequently, the braking moment cannot exceed a certain magnitude.

The suggestion to limit the braking moment by reducing the superimposed pressure in the braking converter has also been shown in the control diagram of the drawing, even though only one method for limiting the braking moment is necessary at a time. In this instance pressure is conveyed to the relief valves 82 and 83 mounted on the starting converters $A_V$ and $A_R$ which are used for braking. The pressure is conveyed through conduit 61 which obtains pressure fluid only during the hydromechanical braking operation, and through conduit 61'''. When the valves 82 and 83 are under no pressure as is the case during normal driving operation, the preload of the spring-loaded pressure limiting piston is so high that during traction operation the pressure limiting valve is ineffective. However, during braking operation the spring preload drops to a lower value so that the pressure limiting valve will become effective. Since the pressure prevailing in conduit 61''' is the pressure delivered by the secondary lubricating pump 13, this pressure also brings about the speed control for the relief valves 82 and 83. A primary influence can easily be realized by pressure from conduits 12 or 38. The two pressure relief valves 82 and 83, one of which respectively pertains to each driving direction, can without difficulty be subjected to pressure simultaneously inasmuch as always one valve only is in operation.

FIG. 2 shows another control member of the same transmission as in FIG. 1. According to this control, an automatic blocking of the filling for all converters is provided which responds when an attempt is made to brake from very high speeds by hydraulic means. Within this speed range it is necessary to brake mechanically. When the locomotive engineer has shifted the lever 41 for the driving direction at a speed above safety speed for hydraulically braking in opposite direction (hydraulic braking), the blocking of the filling of the corresponding starting converter is made ineffective only after the speed has been reduced below the safety speed. To this end, the control device 43 is replaced by a similar reversing device 43' and the shut-off valve 56 is replaced by a reversing valve 56'. Moreover, the control system additionally comprises the shut-off valve 70 in the pilot line 40 for the starting converter. In the pilot control device 43' according to FIG. 3 there is provided a floating piston 71 in addition to the filling pressure operated piston 52 which receives its pressure fluid through conduit 53. This piston 71 has no connection with the piston rod 52' of the piston 52. Piston 71 receives fluid under pressure in case of a hydraulic braking through the branch conduit 61' of the pressure conduit 61.

As long as the pressure chamber ahead of the piston 71 is pressure-free, said piston 71 can axially play in an unimpeded manner. In view of the braking pressure, the floating piston moves to the end position which is preset by the spacer ring 72 which is loosely inserted into the left side of the cylinder chamber. The spacer ring 72 moves piston 52 up to the end position while pushing said piston ahead of itself.

When shifting-over to the opposite driving direction, the piston 71 and together therewith the piston 52 move to a certain position which is adjustable by selecting a corresponding spacer ring. In this way, the influence of the primary side upon the reversing device and the shift-over point of the latter is eliminated. This means that when a certain braking pressure prevails, the shift-over point of the shift-over device 43' will be dependent only on the driving speed. More specifically, at high driving speed—above the adjustable safety limit for hydraulic braking—the throughflow from conduit 42 to conduit 55 is freed and below the same is blocked.

According to FIG. 2, when a braking pressure prevails, the self-returning reversing valve 56', when in working position, returns the control pressure from conduit 55 through conduit 80 to the working side of piston 75 of the self-opening shut-off valve 70. This means that in the control system according to FIG. 2 during the hydraulic braking operation the pilot conduit to the cruising converter is shut-off. The influence of the shift-over device on the primary side and thus the shift-over point is unilaterally made dependent on the driving speed. The precontrol pressure for the cruising converter which is dependent as to function on the changed shifting characteristic of the shift-over device 43' is effective in conduit 55. This pressure is taken advantage of to block or free the starting converter for the opposite driving direction hydraulically when a hydraulic braking is intended. When the locomotive comes to a standstill, the conduit 61 or 61' is without pressure. The precontrol conduits 40 and 55, 55' become free again and the primary influencing effect is again eliminated.

It is, of course, to be understood that the present invention is, by no means, limited to the particular showing in the drawings but that modifications are possible, and that the invention is defined by the scope of the appended claims.

What is claimed is:

1. In a transmission, especially for rail vehicles: an input shaft, an output shaft, forward and reverse drive trains connecting said input shaft with said output shaft, each drive train having therein a higher ratio starting fluid flow power device and a lower ratio cruising fluid flow power device each adapted to be made selectively effective and ineffective by emptying and filling thereof, a source of filling fluid for said devices, control means controlling the supply of filling fluid to said devices, selector means shiftable between forward and reverse positions wherein the fluid is directed to the devices of said forward and reverse drive trains, respectively, said control means having first and second positions wherein said fluid is directed to the starting device and cruising device, respectively, of the drive train corresponding to the positions of said selector means, first means urging said control means toward said first position with a thrust which increases with the speed of the input shaft and second means urging said control means toward said second position with a thrust which increases with the speed of the output shaft whereby the position of said control means is determined by the difference between said speeds, said selector means being shiftable from a position corresponding to the direction of rotation of said output shaft to its other position for hydaulically braking said transmission, and a braking control system operable when said selector means is so shifted to permit the supply of fluid to the starting device only of the drive train pertaining to the shifted position of said selector means while preventing the directing of the said supply of fluid to the cruising device of the last mentioned drive train regardless of the ratio of the speed of said input shaft to that of said output shaft during braking.

2. A transmission according to claim 1 in which said braking control system includes a valve means serially connected with said control means and having a first position to permit the directing of the said fluid supply from a said starting device to the cruising device of the same drive train when a predetermined difference exists between the speeds of said input and output shafts, said valve means having a second position wherein the said directing of the fluid supply is prevented, and means operable during braking for moving said valve means to its said second position.

3. A transmission according to claim 2, which includes a pump driven by a said output shaft and a respective conduit receiving the delivery of said pump in each direction of rotation of said output shaft, spring means urging said valve means toward said first position, fluid operable means for moving said valve means to its said second position, a valve element hydraulically interposed between said conduits and said fluid operable means and connected to said selector means to be actuated thereby, said valve element connecting said fluid operable means to the one of said conduits which is under pressure whenever said selector means is shifted into the position opposite to that which corresponds to the direction of rotation of said output shaft.

4. A transmission according to claim 3, which includes speed sensitive means responsive to speeds of said output shaft above a predetermined speed for preventing the supply of fluid to the starting device of the drive train opposite to that corresponding to the direction of rotation of said output shaft when said selector means is shifted for hydraulically braking thereby to prevent hydraulic braking of the transmission above said predetermined speed of said output shaft.

5. A transmission according to claim 4, which includes fluid pressure signal controlled valve devices receiving said flow from said source of filling fluid and directing the flow to said starting devices in the absence of a signal and to said cruising devices in the presence of a signal, said control means supplying a fluid pressure signal to said valve devices when the ratio of the speed of said input shaft to that of said output shaft is below a predetermined amount and terminating said signal when said ratio is above said predetermined amount, said valve means comprising a first valve normally in a first position to pass the fluid flow from said source to said devices and a second valve normally in a first position to pass said signal from said control means to said valve devices, each valve having fluid operable means for moving it to a second position, the second position of said first valve interrupting the flow from said source to said devices and the second position of said second valve directing the signal from said control means to the fluid operable means of said first valve.

6. A transmission according to claim 5 which includes fluid operable biasing means associated with said control means for urging said control means toward its said first position, and means connecting said fluid operable biasing means with the said fluid operable means of said second valve for receiving fluid from the pump driven by said output shaft during braking of the transmission.

7. A transmission according to claim 6 in which said control means comprises a valve body having an inlet port to receive fluid from said source and an outlet port at which said signal is developed, a valve member in said valve body which interrupts communication between said ports in a first shifted position which corresponds to said first position of said control means, said valve member having a second shifted position corresponding to said second position of said control means and wherein said ports are in communication, governor means driven by said output shaft and connected to said valve member to urge it toward its said second shifted position as the governor speed increases, a first fluid operable area urging said valve member toward its said first shifted position in opposition to the action of said governor, a pump driven by said input shaft and having its outlet connected to said fluid operable area, said fluid operable biasing means comprising a further fluid operable area arranged in assisting relation to said first fluid operable area.

8. A transmission according to claim 7, which includes a motor driving said input shaft and fluid operated speed control means for the motor, and means operable during braking of the transmission for connecting said fluid operated speed control means to the pressure side of said pump driven by said output shaft.

9. A transmission according to claim 7, in which each said starting device comprises a housing which is filled and emptied to make the respective device effective or ineffective, respectively, a pressure limiting valve connected between each housing and a point of exhaust, each pressure limiting valve having fluid operated means associated therewith to adjust the pressure at which the valve opens, and means operable during braking of the transmission for connecting said fluid operated means to a source of pressure to change the pressure at which said valves will open.

10. A transmission according to claim 9 in which each said pressure limiting valve is spring loaded, and the said fluid operated means is operable for adjusting the spring load of the respective pressure limiting valve during braking.

11. A transmission according to claim 9 in which each said pressure limiting valve is spring loaded, and the said fluid operated means is operable for reducing the spring load of the respective pressure limiting valve during braking.

12. A transmission according to claim 11 in which said source of pressure is the pressure side of said pump driven by said output shaft and the connection of said fluid operated means of said pressure limiting valves to said source of pressure is under the control of said valve elements actuated by said selector means.

13. A transmission according to claim 11 in which said source of pressure is the outlet side of the pump driven by said input shaft whereby the braking effect obtained is under the control of the speed of said input shaft.

References Cited

UNITED STATES PATENTS

| | | | |
|---|---|---|---|
| 2,089,590 | 8/1937 | Walti | 60—54 |
| 2,104,213 | 1/1938 | Umlauff | 60—54 |
| 2,142,269 | 1/1939 | Gossler | 74—720X |
| 2,250,702 | 7/1941 | Canaan | 192—4 |
| 2,432,820 | 7/1947 | Baumann | 74—718 |
| 3,324,650 | 6/1967 | Staudenmaier | 60—54X |
| 3,383,951 | 5/1968 | Morrow | 74—718 |
| 3,491,618 | 1/1970 | Neuber | 74—718 |

CARLTON R. CROYLE, Primary Examiner

T. C. PERRY, Assistant Examiner

U.S. Cl. X.R.

74—732; 192—4